United States Patent
Zhang et al.

(10) Patent No.: US 12,105,246 B2
(45) Date of Patent: Oct. 1, 2024

(54) WATER SATURATION ESTIMATION OF PYRITE-RICH FORMATION ROCK

(71) Applicants: Schlumberger Technology Corporation, Sugar Land, TX (US); Saudi Arabian Oil Company, Dhahran (SA)

(72) Inventors: Ping Zhang, Beijing (CN); Wael Abdallah, Dhahran (SA); Dean Homan, Damon, TX (US); Gong Li Wang, Sugar Land, TX (US); Tariq Alshaikh Mubarak, Dhahran (SA); Anas Almarzooq, Dhahran (SA)

(73) Assignees: Schlumberger Technology Corporation, Sugar Land, TX (US); Saudi Arabian Oil Company, Dhahran (SA)

( * ) Notice: Subject to any disclaimer, the term of this patent is extended or adjusted under 35 U.S.C. 154(b) by 543 days.

(21) Appl. No.: 17/429,771

(22) PCT Filed: Feb. 11, 2020

(86) PCT No.: PCT/US2020/017700
§ 371 (c)(1),
(2) Date: Aug. 10, 2021

(87) PCT Pub. No.: WO2020/167791
PCT Pub. Date: Aug. 20, 2020

(65) Prior Publication Data
US 2022/0128726 A1    Apr. 28, 2022

Related U.S. Application Data (60) Provisional application No. 62/804,546, filed on Feb. 12, 2019.

(51) Int. Cl.
*G01V 3/30* (2006.01)
*G01N 27/04* (2006.01)
(Continued)

(52) U.S. Cl.
CPC ............ *G01V 3/30* (2013.01); *G01N 27/048* (2013.01); *G01V 3/34* (2013.01); *G01V 3/38* (2013.01)

(58) Field of Classification Search
CPC ... G01V 3/30; G01V 3/34; G01V 3/38; G01N 27/048
See application file for complete search history.

(56) References Cited

U.S. PATENT DOCUMENTS 4,796,186 A * 1/1989 Kaufman ............... G01V 3/20
702/7
6,470,274 B1 * 10/2002 Mollison ............... G01V 3/28
702/7

(Continued)

FOREIGN PATENT DOCUMENTS

WO    2006052621 A2    5/2006
WO    2010022851 A2    3/2010

OTHER PUBLICATIONS

International Preliminary Report on Patentability issued in the related PCT Application PCT/US2020/017700 dated Aug. 26, 2021, (7 pages).

(Continued)

*Primary Examiner* — Mohamed Charioui
*Assistant Examiner* — Lynda Dinh
(74) *Attorney, Agent, or Firm* — Jeffrey D. Frantz (57) ABSTRACT

Methods and systems are provided that use resistivity log data to estimate water saturation of formation rock and/or other useful formation parameters (such as CEC) in a (Continued)

manner that accounts for one or more electrically conductive mineral components contained in the formation rock.

14 Claims, 4 Drawing Sheets

(51) Int. Cl.
*G01V 3/34* (2006.01)
*G01V 3/38* (2006.01)

(56) References Cited

U.S. PATENT DOCUMENTS

| | | | |
|---|---|---|---|
| 8,638,104 B2* | 1/2014 | Barber | G01V 3/24 324/338 |
| 8,812,237 B2* | 8/2014 | Wilt | G01V 3/30 702/14 |
| 2015/0083404 A1 | 3/2015 | Wilt et al. | |
| 2016/0139293 A1* | 5/2016 | Misra | G01V 3/30 702/7 |
| 2016/0187521 A1* | 6/2016 | Homan | G01V 3/12 324/338 |
| 2018/0113088 A1 | 4/2018 | Misra et al. | |
| 2019/0353819 A1 | 11/2019 | Wang et al. | |
| 2020/0025967 A1 | 1/2020 | Zhang et al. | |

OTHER PUBLICATIONS

Archie, G. E., 1942, The electrical resistivity log as an aid in determining some reservoir characteristics: Trans. Am. Inst. Min., Metall. & Pet. Eng., 146, 54-67.

Waxman, H. and Smits, M., 1968, Electrical conductivities in oil bearing shaly sands. SPE. Journal, vol. 8, p. 107-122.

Clavier, C., Coates, G. and Dumanoir, J., 1977, The theoretical and experimental bases for the Dual Water model for the interpretation of shaly sands. SPE Paper 6859 (16 pages).

Anderson, B., T. Barber, M. Lüling, P. Sen, R. Taherian, and J. Klein, 2008, Identifying potential Gas-Producing shales from large dielectric permittivities measured by induction quadrature signals, Paper HHHH, SPWLA 49th Annual Logging Symposium, Edinburg, Scotland, May 25-28, 2008 (10 pages).

Misra, S., C. Torres-Verdin, A. Revil, D. Homan, and J. Rasmus, 2016a, Interfacial polarization of disseminated conductive minerals in absence of redox-active species, Part 1—Mechanistic model and validation, Geophysics, 81(2), E139-E157.

International Search Report and Written Opinion issued in the related PCT Application PCT/US2020/017700, dated Jun. 9, 2020 (12 pages).

* cited by examiner

WATER SATURATION ESTIMATION OF PYRITE-RICH FORMATION ROCK

CROSS-REFERENCE TO RELATED APPLICATION(S)

The present disclosure is the National Stage Entry of International Application No. PCT/US2020/017700, filed on Feb. 11, 2020, which claims priority from U.S. Provisional Patent Appl. No. 62/804,546, filed on Feb. 12, 2019, entitled "WATER SATURATION ESTIMATION OF PYRITE-RICH FORMATION ROCK," herein incorporated by reference in its entirety.

BACKGROUND

Water saturation of formation rock is a key parameter associated with reservoir characterization, reserve estimations and production planning of existing hydrocarbon deposits. The water saturation can be obtained from different borehole logs (such as nuclear, NMR), however, the most common log used is resistivity (or conductivity). Extensive studies and many methods have been developed around using resistivity (or conductivity) logs to estimate water saturation for different formation conditions.

For clean sand formations, Archie's equation has been used successfully to estimate water saturation. Archie's equation is described in Archie, G. E., 1942, The electrical resistivity log as an aid in determining some reservoir characteristics: Trans. Am. Inst. Min., Metall. & Pet. Eng., 146, 54-67.

For shaly sand formations, both the Waxman-Smith model and the dual-water model have been widely accepted for estimating water saturation. The Waxman-Smith model is described in Waxman, H. and Smits, M., 1968, Electrical conductivities in oil bearing shaly sands. SPE. Journal, Vol. 8, p. 107-122. The dual-water model is described in Clavier, C., Coates, G. and Dumanoir, J., 1977, The theoretical and experimental bases for the 'Dual Water' model for the interpretation of shaly sands. SPE Paper 6859.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Low-resistivity pay and source rocks are widely present in the oilfield formations around the world. In mature oilfields, methods of interpreting and characterizing low-resistivity pay are critical to estimate the true hydrocarbon reserve. There are many possible causes for low-resistivity pay. The primary cause for low-resistivity pay is the presence of clay components (and hence shale components) in the pay due to the inherent conductivity of the clay components. Another cause is conductive minerals like pyrite and magnetite, which are commonly present in organic-rich mudrock and source-rock formations such as veins, laminations, rods, grains, flakes, and beds. Laboratory and field electromagnetic (EM) measurements performed on geomaterials containing electrically conductive inclusions generally exhibit frequency dispersion due to interfacial polarization phenomena at host-inclusion interfaces. As a result, low-resistivity pay is generally observed in oilfields containing conductive mineral inclusions. The challenge for interpreting and characterizing low-resistivity formation rock hinges on extracting the correct measurement of formation resistivity or conductivity that accounts for the shaliness and conductive mineral inclusions of the formation rock and then accurately determining water saturation of the formation rock.

The present disclosure provides a workflow for estimating water saturation ($S_w$) and possibly other useful parameters (such as cation exchange capacity or CEC) of formation rock containing certain electrically conductive mineral components, such as pyrite and/or magnetite. The workflow includes two stages. In the first stage, measured resistivity data or conductivity data of formation rock (such as measured resistivity data or conductivity data of the formation rock as a function of measured depth and radius acquired by a downhole logging tool) is inverted to solve for data characterizing resistivity (or conductivity) and frequency-dependent complex permittivity of the formation rock ($\sigma_r + i\omega \in_r \in_0$). The data characterizing permittivity of the formation rock is used to determine if the effects of the conductive mineral components in the formation rock should be accounted for or can be ignored. In the second stage, if and when it is determined that the effects of the conductive mineral components in the formation rock can be ignored, then existing methods can be used to estimate water saturation of the formation rock and/or other useful formation parameters (such as CEC). Otherwise (if and when it is determined that the effects of the conductive mineral components in the formation rock should be accounted for), a physical model of the formation rock that quantifies distortion effects of the conductive mineral components on the data acquired by the tool can be used to quantify and remove such distortion effects from the acquired tool data, the resulting corrected data can be inverted to update the data characterizing resistivity or conductivity of the formation rock, and the updated formation resistivity or conductivity data can be used to determine data characterizing water saturation of the formation rock and/or other useful formation parameters (such as CEC). In embodiments, the physical model can represent the conductive mineral components (such as pyrite and/or magnetite) of the formation rock as electrically-conductive inclusions that are uniformly distributed in a fluid-filled, porous matrix made of nonconductive grains possessing surface conductance, such as silica and clay grains. New inversion methods for downhole induction logging tools are also provided and claimed.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

At least two factors can cause low-resistivity pay: clay and conductive minerals. The underlying physics for each factor is different. Clay minerals have a substantial negative surface charge that cause log resistivity values to plummet. This negative surface charge, the result of substitution in the clay lattice of atoms with lower positive valence, attracts cations such as Na+ and K+ when the clay is dry. When the clay is immersed in water, cations are released, increasing the water conductivity. The cation exchange capacity (CEC) of formation rock is a measure of the ability of clay in the formation rock to release cations. Clays with a high CEC will have a greater impact on lowering resistivity than those with low CEC. Extensive studies have been conducted to account for clay effects and to extract accurate water saturations. The widely used methods are Waxman-Smith and dual-water models. Recently a method has been developed which uses induced polarization and effective-medium theory to correctly estimate both water saturation and CEC for shaly sands (See co-owned United States Publication No.: 2020-0025967 entitled "Formation Clay Typing from Array Electromagnetic Measurements").

Conductive minerals can have strong interfacial polarization (IP), which influence electromigration, charge carrier accumulation/depletion, and electro-diffusion processes in host materials. A resistivity interpretation method that neglects IP effects will lead to inaccurate estimation of petrophysical properties of formations containing electrically conductive inclusions. In geomaterials such as formation rock, charge carriers in a porous brine-filled host are ions, whereas those in an electrically conductive mineral inclusion are holes and electrons. In the presence of an externally applied electric field, nonmetallic particles and conductive particles develop a counterion cloud and diffused-charge distribution around host-inclusion interfaces. Variations in the external electric field perturb the charge distribution around host-inclusion interfaces from its equilibrium state. Therefore, in the presence of a time-varying electric field, electromigration, charge carrier accumulation/depletion, and diffusion processes will alter formation resistivity measurements and lead to inaccurate estimation of formation water saturation.

To properly estimate water saturation of formation rock that include clay minerals and conductive mineral components (such as pyrite and/or magnetite), such as in shale formations or shaly sand formations, interpretation methods based on resistivity or conductivity logs need to account for the effects of clay minerals, clay-sized particles, and conductive minerals. Modern downhole induction logging tools measure in phase (R) and quadrature (X) signals as a function of measured depth in the borehole. The R signal is that part of the alternating signal at a receiver of the downhole induction logging tool that is in phase with the transmitter current and depends on the formation resistivity (or conductivity). The X signal is that part of the alternating signal at a receiver of the downhole induction logging tool that is out of phase with the transmitter current and is less sensitive to formation resistivity (or conductivity). The X signal is expected to be small and positive, providing information for skin-effect corrections in the formation rock. However, several downhole induction logging measurements show large, negative X signals in certain shale formations which contain conductive minerals (Anderson et al., "Identifying potential organic shales from large dielectric permittivities measured by induction quadrature signals," Paper HHHH, *SPWLA 49th Annual Logging Symposium*, Edinburg, Scotland, 25-28 May 2008). Based on dielectric inversion of such logs, these shale formations exhibit high dielectric-permittivity values and frequency dispersion of electrical-conductivity and dielectric permittivity estimates.

A workflow is provided to determine the frequency-dependent effective-dielectric permittivity and electric resistance (or conductivity) of geomaterials (such as reservoir rock) containing conductive minerals, clay-sized grains, and clay particles. The workflow can employ inversion of R and X signal data acquired from an induction logging tool and outputs data characterizing formation resistivity (or conductivity) and frequency-dependent complex permittivity ($\sigma_r + i\omega \in_r \in_0$). Similarly, a propagation tool can be used where the log of attenuation and phase shift measurements acquired by the propagation tool play an equivalent role and sensitivity as the R and X signals, but at a higher frequency with reduced sensitivity to the clays and more sensitivity to the metallic inclusions. Based on the values of the calculated permittivity, it is possible to identify the effects of conductive mineral components in the formation rock. From numerous field examples, it is determined that if the formation contains 5% pyrite and its grain size is no less than 50 micro-meters, then the resulting permittivity should be larger than 20,000. A physical model has been developed to calculate the contributing factors or effects of conductive mineral components based on their grain sizes and weight factors (e.g., weight fractions). The contributing factors or effects can be removed from the R and X signal data acquired by the logging tool and the resulting R and X signal data can be inverted to determine data characterizing resistivity (or conductivity) of the formation rock. The resulting resistivity or conductivity data values can be interpreted using existing methods. This processing technique may be applied to all induction logs that record the R and X signals wherever they have been or will be acquired in hydrocarbon-rich shale formations around the world.

In another aspect, the workflow is configured to estimate water saturation of formation rock and/or other useful formation parameters (such as CEC) using resistivity log data.

Figure 1:
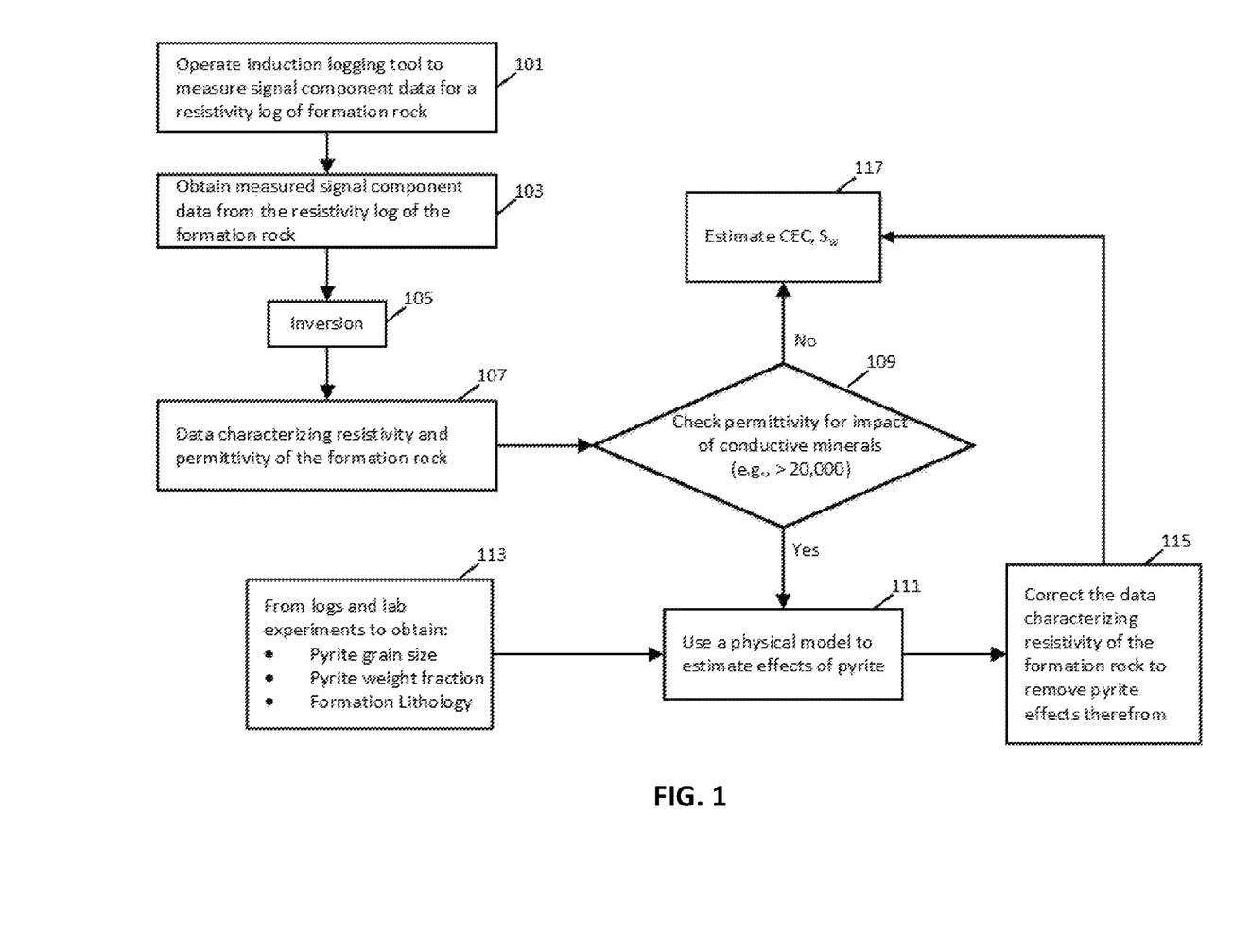
FIG. 1 is a flowchart illustrating a workflow that estimates water saturation and cation exchange capacity for formation rock using resistivity log data obtained by an induction logging tool.

An example of such a workflow is shown in FIG. 1.

In block 101, an induction measurement is performed on a sample volume of formation rock investigated by a downhole induction logging tool (for example, the downhole tool described below with respect to FIGS. 3 and 4). The induction measurement acquires X signal component data and R signal component data that result from interaction of electrical signals with the formation rock. The formation rock may include (or is expected to include) clay minerals and conductive mineral components (e.g., pyrite and/or magnetite), such as in shale formations or shaly sand formations.

In block 103, the signal component data and R signal component data that result from the induction measurement are collected or obtained.

In block 105, an inversion process is performed using the X signal component data and the R signal component data obtained in block 103 to determine data characterizing resistivity (or conductivity) and complex permittivity or dielectric constant ($\sigma_r + i\omega \epsilon_r \epsilon_0$) of the formation rock (block 107). The inversion process can employ a model based on Maxwell's equations to solve for the data characterizing resistivity (or conductivity) and complex permittivity (or dielectric constant) of the formation rock. The stopping criteria for the inversion process can also be based on cost function. The cost function may include one or more parameters related to physical properties of the rock formation, such as resistivity (or conductivity), permittivity (or dielectric constant), and position within the rock formation. For example, the cost function may include a misfit term, an entropy term, and a smoothing term. In some embodiments, one or more of the terms (e.g., the misfit term, the entropy term, and the smoothing term) may be parameterized based on the resistivity (or conductivity) and/or permittivity (or dielectric constant) as defined by the model. An example of such a model is described in co-owned U.S. Patent Publication No. 2019-0353819, herein incorporated by reference in its entirety.

In block 109, the data characterizing permittivity of the formation of block 107 as determined from the inversion process of block 105 can be evaluated for possible effects of conductive mineral components in the formation rock. For example, the evaluation can check whether the complex permittivity of the formation rock ($\sigma_r + i\omega \epsilon_r \epsilon_0$) is less than 20,000. If so (i.e., the case that the permittivity of the formation rock is less than 20,000), the operations can bypass blocks 111 to 115 and continue to block 117 as described below. If not (i.e., the case that the permittivity of the formation rock is larger than 20,000), this can be interpreted as an indication that the effects of conductive mineral components in the formation rock are too large to ignore and the operations continue to block 111 to 115. In embodiments, the evaluation of block 109 can evaluate the log data of multifrequency dielectric permittivity measurements on the formation rock to assess the importance or effects of conductive mineral components in the formation rock. For example, the multifrequency dielectric permittivity measurements can employ higher frequencies such that the resulting log data can detect conductive minerals which have small grain sizes.

In block 111, a physical model can be used to quantify the complex-valued electrical conductivity response of geomaterials (i.e., formation rock) that contain electrically conductive mineral components, such as pyrite and magnetite. In embodiments, the physical model can represent electrically conductive mineral inclusions uniformly distributed in a fluid-filled, porous matrix made of nonconductive grains possessing surface conductance, such as silica and clay grains. An example physical model is described in Misra et al, "Interfacial polarization of disseminated conductive minerals in absence of redox-active species, Part 1 Mechanistic model and validation", Geophysics, 81(2), E139$\in$157, 2016a. The physical model can be used to calculate contributing factors or effects of the conductive mineral components on the X signal component data and the R signal component data collected or obtained in block 103. The physical model can employ data obtained from log or lab experiments, such as pyrite grain size, pyrite weight fraction and formation lithology as represented by block 113.

In block 115, the contributing factors or effects of the conductive mineral components on the X signal component data and the R signal component data as provided by the physical model of block 111 can be used to remove such effect from the X signal component data and the R signal component data collected or obtained in block 103 in order to generate corrected X signal component data and corrected R signal component data that are free from the effects of the conductive mineral components. Furthermore, as part of block 115, the inversion process of block 105 can be repeated using the corrected X signal component data and the corrected R signal component data to solve for corrected formation resistivity data (or corrected formation conductivity data), which is data that characterizes resistivity (or conductivity) of the formation rock that accounts or compensates for the effects of the conductive mineral components in the formation rock.

In block 117, for the case where the effects of conductive mineral components in the formation rock are negligible and blocks 111 to 115 are bypassed, the formation rock can be treated as containing mostly either clean sand or shaly sand. For the former (clean sand), Archie's law can be used to determine data characterizing water saturation ($S_w$) of the formation rock. For the later (shaly sand), data characterizing water saturation and CEC or other parameters of the formation rock can be determined from the method outlined in co-owed U.S. Patent Publication No.: 2020-0025967, herein incorporated by reference in its entirety. However, in block 117, for the case where the effects of conductive mineral components in the formation rock are too large to ignore and blocks 111 to 115 are carried out, the corrected formation resistivity data (or the corrected formation conductivity data) generated in block 115 can be used to determine data characterizing water saturation and/or CEC or other parameters of the formation rock as described above.

In embodiments, the workflow can be configured to quantify the effects of clay and conductive minerals on the measured formation resistivity or conductivity. In embodiments, the workflow can be configured to quantify the effects of conductive minerals from the measured formation resistivity and knowledge of pyrite fraction and its size distribution. In further embodiments, the workflow can be configured to remove the effects of conductive minerals from the measured formation resistivity or conductivity and accurately estimate water saturation and CEC or other formation parameters for formations with clay minerals and conductive mineral components (e.g., pyrite and/or magnetite), such as in shale formations or shaly sand formations.

It will be appreciated that the workflow as described herein can employ a downhole induction logging tool (such as a wireline or logging-while-drilling tool) that is conveyable in a wellbore that traverses the reservoir rock under investigation. For example, see FIGS. 2 and 3 below. Alternatively or additionally, the workflow can employ a laboratory apparatus or wellsite apparatus that performs the induction measurement on the reservoir rock, such as a plug or core sample or drill cuttings.

Figure 2:
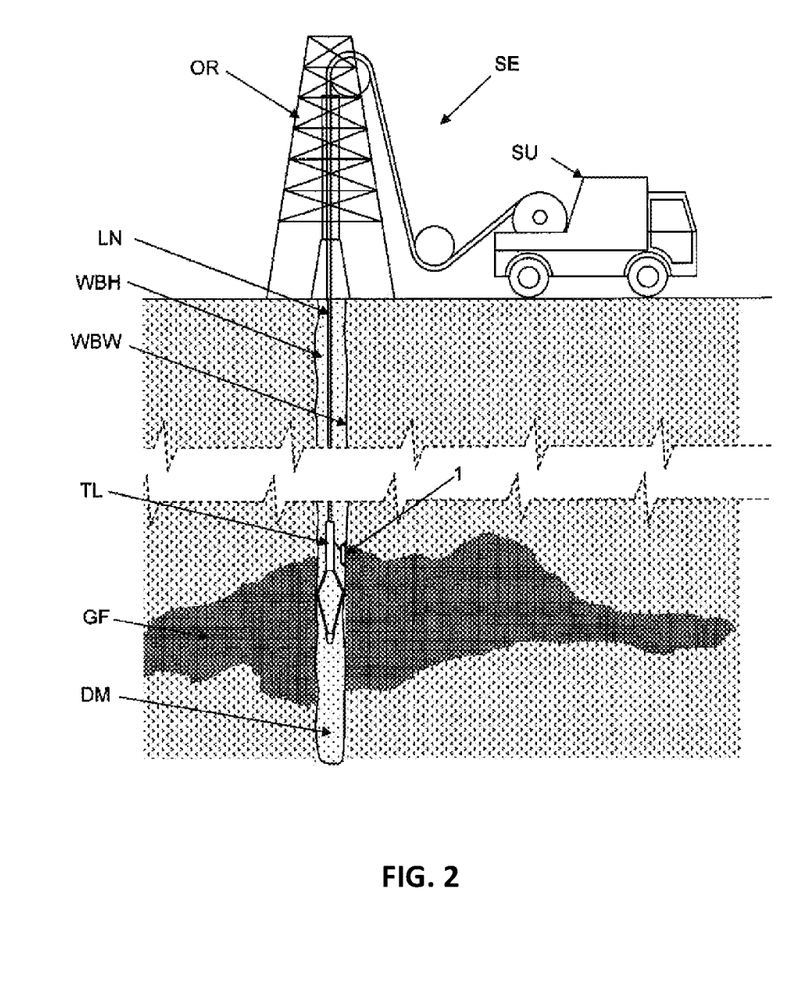
FIG. 2 is a schematic diagram illustrating an example onshore hydrocarbon well location.

FIG. 2 is a schematic diagram that illustrate an example onshore hydrocarbon well location with surface equipment SE above a hydrocarbon geological formation GF after drilling operation has been carried out. At this stage, i.e. before a casing string is run and before cementing operations are carried out, the wellbore WBH is filled with a fluid mixture DM, which is typically a mixture of drilling fluid and drilling mud. In this example, the surface equipment SE comprises an oil rig OR and a surface unit SU for deploying a logging tool TL in the wellbore WBH. The surface unit may be a vehicle coupled to the logging tool by a wireline cable LN. Further, the surface unit comprises an appropriate device for determining the depth position of the logging tool TL relative to the surface level. The logging tool TL may comprise a centralizer that is configured to ensure a correct axial positioning of the logging tool in the wellbore WBH.

The logging tool TL comprises various tools or sensors and provides various measurement data related to the hydrocarbon geological formation GF and/or the fluid mixture DM. These measurement data are collected by the logging tool TL and transmitted to the surface unit SU. The surface unit SU comprises appropriate electronic and software arrangements for processing, analyzing and storing the measurement data provided by the logging tool TL.

It should be appreciated that in an alternative embodiment such processing circuitry is capable of being located downhole in or near the logging tool TL itself. Such processing circuitry being capable of handling all the processing functionality pertaining to the various measurements and models described herein.

Moreover, while FIG. 2 shows a wireline application, it should also be appreciated that the embodiments described herein are equally applicable to logging while drilling applications. That is, there is no need for the logging tool to be limited to an application wherein it is attached to a separate wire or cable controlling its movements, it is possible for the different functionality of the logging tool to be incorporated into the actual drill pipe itself (for example on the drill collar). This advantageously allows the benefits of the improved imaging techniques described herein to be used during the initial drilling stage as well. It should also be appreciated that the embodiments described herein are equally applicable to wellsite or laboratory applications where the workflow is carried out on one or more rock samples, such as core samples or drill cuttings, that originate from the geological formation GF.

Figure 3:
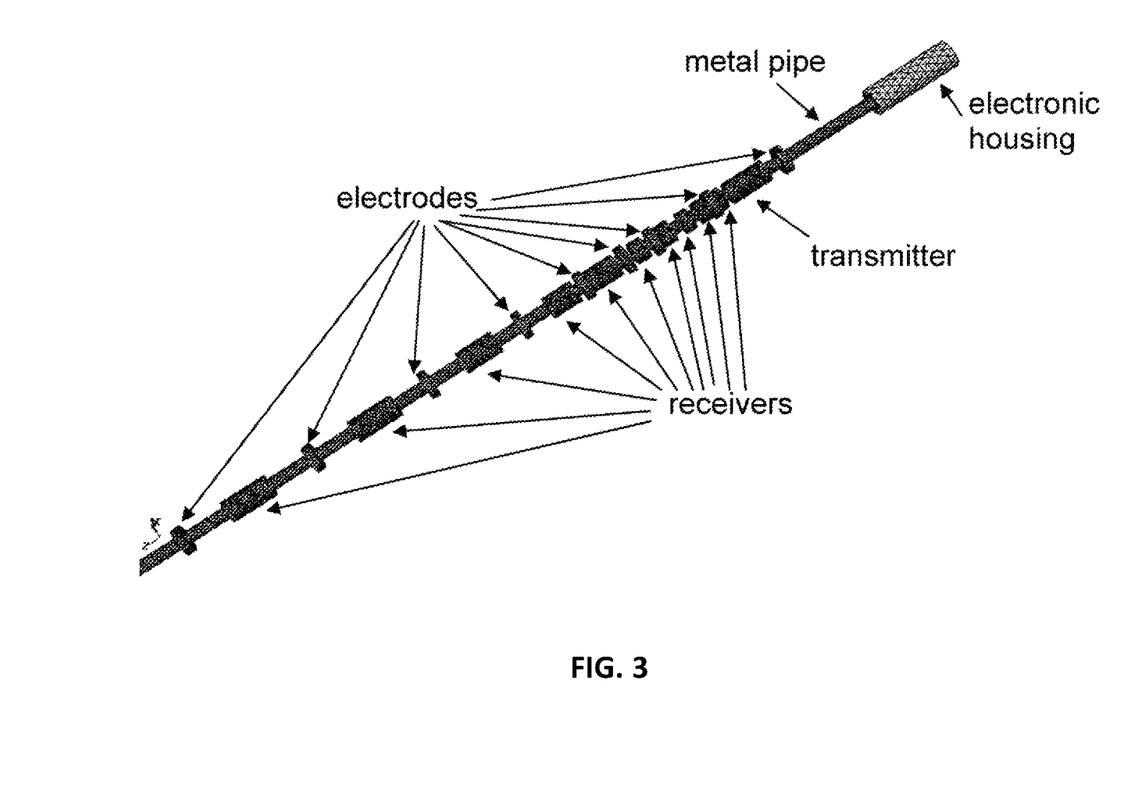
FIG. 3 is a schematic diagram of an induction logging tool.

FIG. 3 is a schematic diagram of an induction logging tool that can be included as part of the logging tool TL and configured to perform the induction measurement as part of the workflow described herein in order to investigate the geological formation GF traversed by the wellbore WBH. The induction logging tool includes a metal pipe inside an insulating mandrel which supports mutually orthogonal and collocated transmitter and receiver coils. The tool includes a transmitter with three transmitter coils along with several receivers spaced therefrom. The three transmitter coils are energized by an alternating current. The oscillating magnetic field produced by this arrangement results in the induction of currents in the formations which are nearly proportional to the conductivity of the formations. These currents flow orthogonal to the planes oriented with respect to respective transmitter normals in the X, Y and Z directions, which are defined by the directions of the dipole moments of each of the three transmitter coils. These currents contribute to the voltage induced in one or more of the receiver coils. The X and R signal components of such voltage signals can be obtained and converted into digital form as X and R signal component data. Such multi-component signal data can be interpreted by inversion processing to determine a log of formation resistivity (or conductivity) and permittivity (or dielectric constant) as well as other useful petrophysical parameters, such as anisotropy, relative dip angles, strike angles, sand and shale content and water saturation. The electrodes coupled the metal pipe to the exterior of the tool and the borehole fluid. These electrodes are positioned above and below the transmitter and receiver antennas as well as in-between the antennas, and function to compensate for tool eccentricity. The electronics housing can include a signal generator and power amplifiers (not shown) to cause alternating currents of selected frequencies to flow through transmitter coils. A processor which controls the operation of the tool and processing acquired data may be part of the electronics housing. The electronics housing can also include communication equipment for communicating the X and R signal component data to a surface processor for follow-on processing as part of the workflow. Alternatively, some or all of the processing and control may be done by the surface processor.

In other embodiments, the induction logging tool can be an array induction logging tool, such as the AIT or Thrubit Induction tools of Schlumberger Technology Corporation. In still other embodiments, the workflow can be based on attenuation and phase shift measurements acquired by a propagation-type downhole tool as a substitute for the R and X signals acquired by the induction tool.

Note that the downhole measurement of the workflow can be performed at different depths in the wellbore in order to investigate different parts of the geological formation that is traversed by the wellbore, and the processing of the workflow can be repeated for the corresponding downhole measurements at the respective depths in order to quantify the effects of clay and conductive minerals on the measured formation resistivity or conductivity at the measured depths and remove the effects of the conductive minerals from the measured formation resistivity or conductivity and accurately estimate water saturation and CEC or other formation parameters at the measured depths. Such analysis is particularly useful for formations with clay minerals and conductive mineral components (e.g., pyrite and/or magnetite), such as in shale formations or shaly sand formations.

Figure 4:
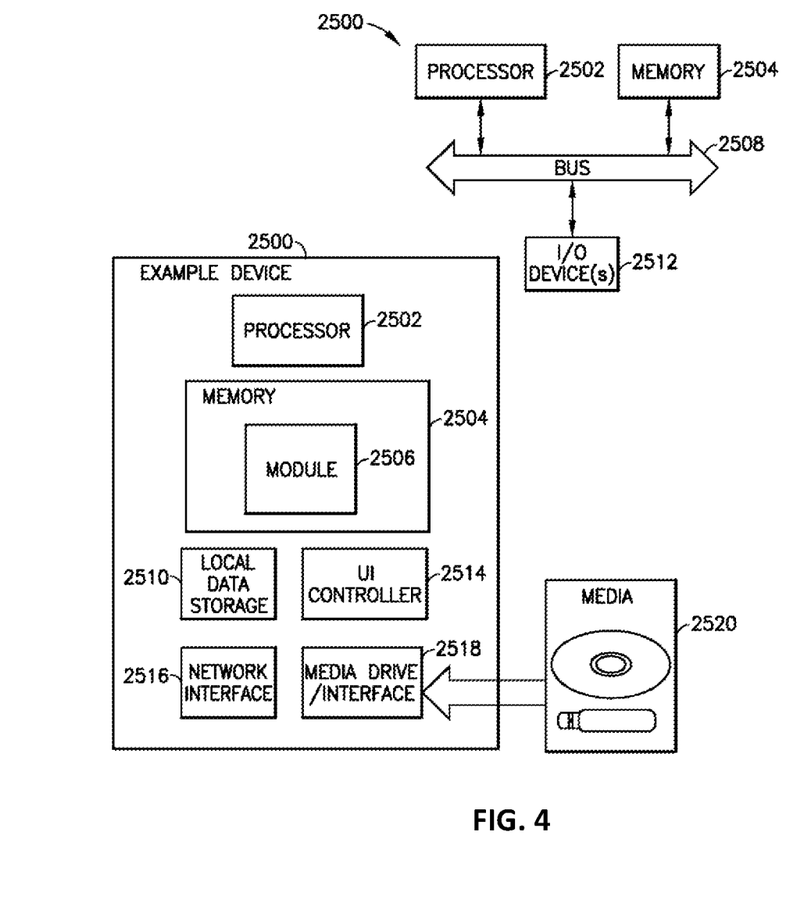
FIG. 4 is a schematic diagram of a computer system.

FIG. 4 illustrates an example device 2500, with a processor 2502 and memory 2504 that can be configured to implement various embodiments of the workflow described herein. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes or parts of the workflow of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In embodiments, any one or any portion or all of the steps or operations of the workflow as described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

There have been described and illustrated herein one or more embodiments of methods and systems that use resistivity log data to estimate water saturation of formation rock and/or other useful formation parameters (such as CEC) in a manner that accounts for at least one electrically conductive mineral component contained in the formation rock. It will therefore be appreciated by those skilled in the art that yet other modifications could be made to the provided invention without deviating from its spirit and scope as claimed.

What is claimed is:

1. A method of characterizing formation rock which includes at least one electrically conductive mineral component, comprising:
   a) collecting or obtaining electrical signal data that results from interaction of electrical signals with the formation rock;
   b) using a physical model that quantifies electrical conductivity response of the formation rock to calculate effects of the at least one electrically conductive mineral component on the electrical signal data, the physical model representing electrically conductive mineral inclusions uniformly distributed in a fluid-filled, porous matrix made of nonconductive grains possessing surface conductance;

c) processing the electrical signal data of a) to remove the effects of the at least one electrically conductive mineral component as calculated in b);

d) performing an inversion process using the resultant electrical signal data of c) to determine data characterizing resistivity or conductivity of the formation rock; and e) using the data characterizing resistivity or conductivity of the formation rock of d) to determine at least one parameter of the formation rock, the at least one parameter comprising at least one of water saturation or cation exchange capacity (CEC), wherein the data characterizing resistivity or conductivity of the formation rock is used to determine the at least one of water saturation or CEC of the formation rock in e) to estimate a true hydrocarbon reserve in the formation rock, and wherein the use of the data characterizing resistivity or conductivity of the formation rock to determine the at least one of water saturation or CEC of the formation in e) provides benefits for performing operations of b) to e) to improve estimation of a hydrocarbon reserve.

2. The method according to claim 1, wherein the at least one electrically conductive mineral component comprises at least one of pyrite or magnetite.

3. The method according to claim 1, wherein the formation rock includes clay minerals and the at least one electrically conductive mineral component.

4. The method according to claim 1, further comprising:
performing another inversion process using the electrical signal data of a) to determine data characterizing complex permittivity of the formation rock; and
using the data characterizing complex permittivity of the formation rock to selectively perform the operations of b) to e).

5. The method according to claim 1, wherein the electrical signal data of a) comprises an in-phase signal component data and an out of phase signal component data acquired by an induction logging tool.

6. The method according to claim 1, wherein the electrical signal data of a) comprises attenuation signal component data and phase-shift signal component data acquired by a propagation logging tool.

7. The method according to claim 1, further comprising operating a downhole induction logging tool to acquire the electrical signal data of a).

8. The method according to claim 1, wherein the operations of a) to e) are performed by a processor.

9. A method of characterizing formation rock which includes at least one electrically conductive mineral component, the method comprising:

a) collecting or obtaining electrical signal data that results from interaction of electrical signals with the formation rock;

b) performing an inversion process using the electrical signal data of a) to determine data characterizing complex permittivity of the formation rock;

c) using the data characterizing complex permittivity of the formation rock to selectively perform the following:
i) using a physical model that quantifies electrical conductivity response of the formation rock to calculate effects of the at least one electrically conductive mineral component on the electrical signal data, the physical model representing electrically conductive mineral inclusions uniformly distributed in a fluid-filled, porous matrix made of nonconductive grains possessing surface conductance,
ii) processing the electrical signal data of a) to remove the effects of the at least one electrically conductive mineral component as calculated in i);
iii) performing another inversion process using the resultant electrical signal data of ii) to determine data characterizing resistivity or conductivity of the formation rock; and
iv) using the data characterizing resistivity or conductivity of the formation rock of iii) to determine at least one parameter of the formation rock, the at least one parameter comprising at least one of water saturation or cation exchange capacity (CEC), wherein the data characterizing resistivity or conductivity of the formation rock is used to determine the at least one of water saturation or CEC of the formation rock in c)iv) to estimate a true hydrocarbon reserve in the formation rock, and wherein the use of the data characterizing resistivity or conductivity of the formation rock to determine the at least one of water saturation or CEC of the formation in iv) provides benefits for performing operations of b) to c)iv) to improve estimation of a hydrocarbon reserve.

10. The method according to claim 9, wherein the at least one electrically conductive mineral component comprises at least one of pyrite or magnetite.

11. The method according to claim 9, wherein the formation rock includes clay minerals and the at least one electrically conductive mineral component.

12. The method according to claim 9, wherein the electrical signal data of a) comprises attenuation signal component data and phase-shift signal component data acquired by a propagation logging tool.

13. The method according to claim 9, further comprising operating a downhole induction logging tool to acquire the electrical signal data of a).

14. The method according to claim 9, wherein the operations of a) to c)iv) are performed by a processor.

* * * * *